Patented May 1, 1934

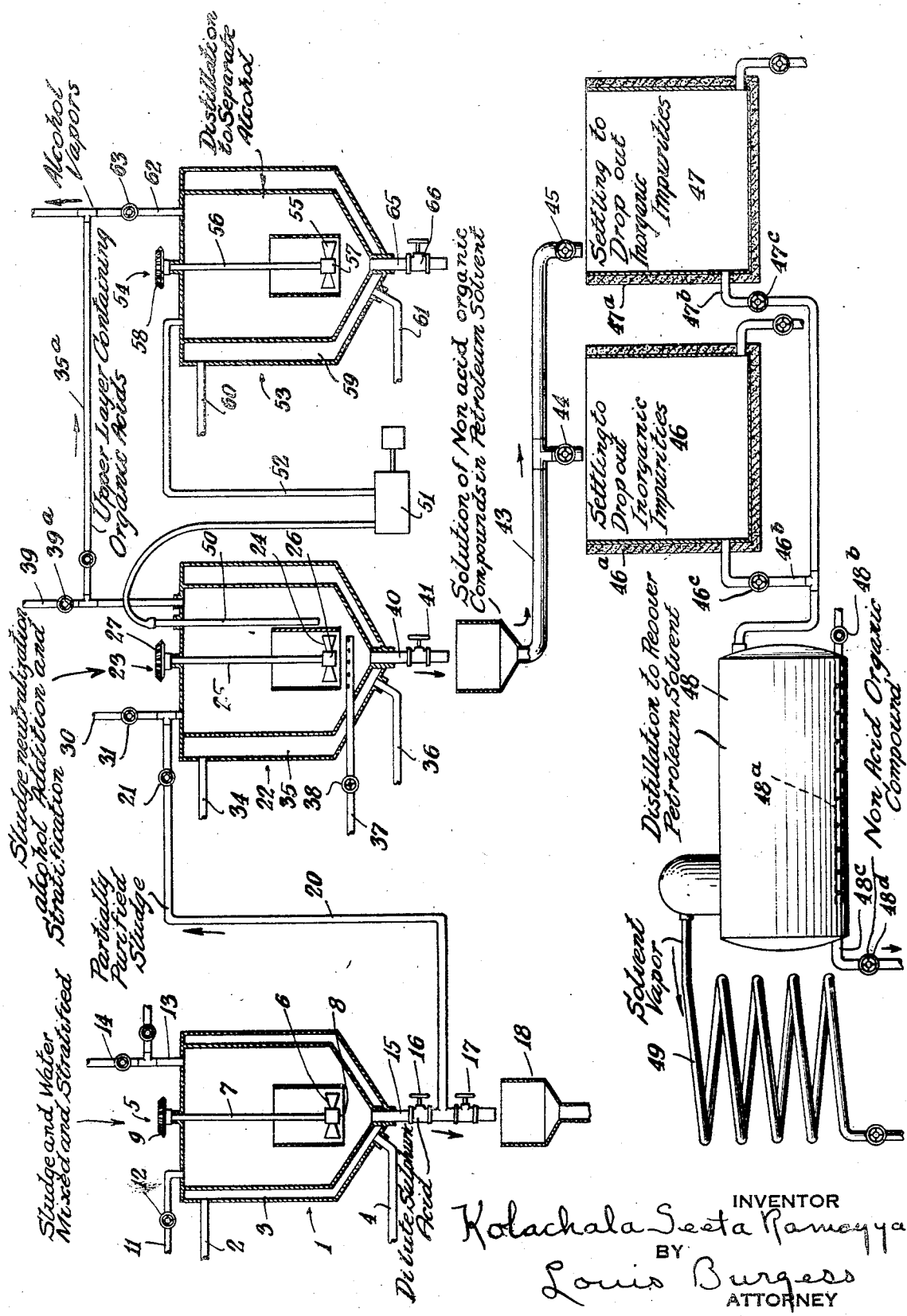

1,956,592

UNITED STATES PATENT OFFICE 1,956,592

ART OF TREATING PETROLEUM SLUDGES

Kolachala Seeta Ramayya, Brooklyn, N. Y.

Application January 9, 1930, Serial No. 419,703

8 Claims. (Cl. 260—159)

The object of the invention, inter alia, is the production of a more valuable petroleum sulphonic acid or salt thereof from the sludges produced by the action of fuming sulphuric acid on petroleum oils and is also the production of a material of uniformly high and reproducible quality.

Highly refined petroleum products such as white oils, medicinal oils, certain grades of transformer oils, and other special products are produced by a process which involves the treatment of a petroleum oil with fuming sulphuric acid. In carrying out such a process, the oil is ordinarily mixed with a proportion of fuming sulphuric acid and agitated. This results in the formation of a black viscous sludge, insoluble in the oil phase and separable therefrom by stratification. The proportion of acid to oil may vary over considerable limits, for example, it may vary for any individual treat from 3 to 20% by volume of the original oil treated. After stratification and separation of the sludge the treatment may be repeated, and not infrequently, several successive treatments of this character are applied to a petroleum oil. The concentration of fuming acid employed for this purpose may likewise vary over wide limits, and may, for example, range from $H_2SO_4$ plus several percent of uncombined $SO_3$ up to pure sulphuric anhydride. All such concentrations, including the anhydride, will be herein denoted by the term fuming sulphuric acid. The sludges produced by this treatment and separated from the oil treated contain unconsumed sulphuric acid and considerable organic acids derived from the interaction of the fuming sulphuric acid with the oil. These organic acids may be hereinafter referred to as the green organic acids in contradistinction to other organic acids not characteristic of the said sludges. Such sludges may, for example, contain from 25 to 75% of organic acids depending upon the oil treated, mode of treatment, and number of previous treats. The organic acids referred to are soluble in water, and the salts thereof are ordinarily referred to as sulphonates.

I have found that these acids and the water soluble salts thereof, such as the sodium salt as ordinarily prepared from the sludges mentioned, although apparently dissolving in water to form a solution, are not homogeneously water soluble but are actually composed of two substances, viz, an organic acid and a proportion of non-acid organic compounds which are not water soluble per se but are apparently carried into solution by the organic acid present or by the salt derived therefrom. I have found that the effect of the associated non-acid organic compounds is to diminish the capacity of the said organic acid or its salt for performing useful functions.

A further effect of the associated non-acid organic compounds is to render it difficult to duplicate an acid or salt of definite characteristics, inasmuch as the non-acid organic compounds may exist in the acid or salt in variable and unappreciated quantities. I have found that an acid or salt of exceptional and improved characteristics may be obtained by appropriate treatment adapted to free the same of the associated non-acid organic compounds, and further, that the non-acid organic compounds so removed have individual and valuable characteristics which were prior to their removal expended in loading and deteriorating the organic acid or the salt derived therefrom.

Solution in water is not adequate to separate the organic acids from the non-acid organic compounds for as pointed out, the non-acid organic compounds are held in solution by the organic acid or salts therefrom. I have found however that this separation may be effected by the use of an appropriate solvent, and while other solvents may be employed for this purpose, I preferably may be employed for this purpose, I preferably use an aqueous solution containing an alcohol of not exceeding 3 carbon atoms in proportions of 25 to 75% alcohol by volume. My preferred practice comprises the employment of an aqueous solution of ethyl alcohol containing from 40 to 60% ethyl alcohol by volume. The proportion of total solute to total solvent at this stage may vary from one ninth to equal parts.

I am aware of the fact that the organic acids contained in sludges of the type hereinabove described have previously been separated into two components, including an organic acid which is predominantly water soluble, and an organic acid which when isolated is not highly soluble in water. Such acids cannot, however, be separated one from the other by the use of solvents of the type herein described. The non-acid organic compounds which I separate do not belong to the organic acids mentioned, but are distinct and different compounds. They may consist in part of higher alcohols, disulphids, thio-ethers, thioalcohols, and may comprise hydrocarbons. These substances will be generically referred to herein as the non-acid organic compounds.

I may carry out this separation in acid solution, but I find it preferable to carry out this part of the process in a solution which has been made substantially neutral by first converting both the organic acids and sulphuric acid to water soluble salts such as sodium or potassium salts starting with the solution of the sludge in water. In ordinary practice, sodium is preferred. This treatment results in the formation of two layers. The upper layer contains the sodium salts of the organic acids. This layer is separated and the salts of the organic acids may be produced therefrom in substantially pure condition by evaporation and removal of the alcohol and water. Alternatively, the alcohol only may be removed leaving the salts of the organic acid in aqueous solution.

This treatment may be repeated if desired. A succeeding treatment with stronger alcohol may be applied to the sodium sulphonate if desired to remove the last traces of inorganic compounds.

The lower layer contains inorganic salts and the non-acid organic compounds, and I preferably separate the hydrocarbons from the salts by adding to this layer a solvent in which the non-acid organic compounds are selectively soluble such as, for example, naphtha, kerosene, or a light mineral oil. By incorporating this layer with the solvent and settling, the inorganic compounds are precipitated leaving a supernatant solution containing the separated purified non-acid organic compounds.

It is immaterial whether the non-acid organic compounds herein referred to exist as such in the original sludge or are formed therefrom as a result of dissolving the sludge in an aqueous medium, for example, by hydrolysis of certain components found in the sludge. Regardless of the mechanism by which these materials become associated with the organic acids or derivatives thereof, they will be hereinafter referred to as the non-acid organic compounds or as the associated non-acid organic compounds.

In practice I find it desirable to make a preliminary separation of sulphuric acid from the sludge, and while this separation can be made in any desired manner, for example, by mixing the sludge with saturated sodium chloride brine in quantity sufficient to form two liquid phases, I preferably effect this preliminary separation by admixing water with the sludge. If the quantity of water is carefully controlled, the sulphuric acid present in the sludge will operate to form two liquid phases, one comprising the bulk of the sulphuric acid originally present, while the other phase comprises the major part of the organic compounds originally present. This separation may be expedited by steaming or heating the solution of sludge in water. In practice, the sludge is preferably heated for a period with an equal volume of water and permitted to stand until the two liquid phases are produced. It may be necessary to cool the entire mixture subsequent to heating in order to facilitate good separating of the two phases. The lower phase contains the bulk of the sulphuric acid originally present and may be reconcentrated or utilized in any other manner. The upper phase containing the major part of the organic compounds is selected and subjected to the purification treatment hereinabove described.

The drawing is a vertical elevation with parts in section of an apparatus in which my invention may be carried into effect. This apparatus, and one specific mode of carrying the invention into effect, will be jointly described.

The kettle 1 is charged with a definite volume of water. This is warmed by the introduction of steam through pipe 2 to steam jacket 3 condensate passing off through pipe 4. The agitating device 5 comprising propeller 6, propeller shaft 7, seated in bearing 8, is then operated through bevel gear 9 by means of a drive mechanism not shown. A continuous stream of sludge is then passed into kettle 1 through pipe 11, controlled by valve 12. The sludge is continuously admitted until the amount of sludge introduced is equal in volume to the water originally present. The ratio of sludge to water may, of course, vary over considerable limits. The volume of water necessary to produce the desired separation into two phases can be determined in any case, if desired, by a few preliminary experiments in glass with different volumes of water. Some $SO_2$ is liberated during the mixing and passes off from kettle 1, through pipe 13, controlled by valve 14. When the mixing is complete, the mixture is permitted to stand for a period sufficient to permit the formation of two phases and stratification thereof which may require several hours.

In case separation does not occur readily at the temperature of the mixture cooling the same to temperatures below 30° C. for example, between 0 and 30° C. accelerates separation. At the expiration of this time, the lower layer consisting principally of dilute sulphuric acid is withdrawn through pipe 15, controlled by valves 16 and 17, and is discharged through funnel 18 for reconcentration or disposal in any suitable manner. As soon as the acid layer has been completely withdrawn, valve 17 is closed and the upper layer consisting principally of organic compounds is blown from kettle 1, through pipe 20, controlled by valve 21, into kettle 22. Agitation is maintained in kettle 22 by means of agitation device 23 which includes propeller 24, carried by propeller shaft 25, seated in bearing 26. Propeller shaft 25 is operated through bevel gear 27 by means of drive mechanism not shown. Sufficient water is now added so that after neutralizing with caustic soda solution, the percentage of total solids present will be 25 to 60. Alcohol is now added through pipe 30, controlled by valve 31, until the volume of alcohol is sufficient to make the ratio of alcohol to water in the mixture approximately equal to one. Agitation is then discontinued and the mixture is permitted to settle for a few hours during which stratification takes place resulting in the formation of a lower and heavier phase consisting of non-acid organic compounds with inorganic compounds dispersed therein.

The upper phase is carefully decanted by means of the adjustable suction tube 50 and transferred by means of pump 51 and pipe 52 into kettle 53. This kettle is similarly equipped with agitation device 54, comprising propeller 55, secured to shaft 56, seated in bearing 57. The shaft 56 is rotated through bevel gear 58, by means of a drive mechanism not shown. This agitating mechanism is set in operation and steam is admitted to jacket 59, through inlet pipe 60, any condensate being withdrawn through pipe 61. The quantity of steam is controlled to distill off practically all the alcohol in the liquid charged to kettle 53, the alcohol vapors being taken off overhead through pipe 62, controlled by valve 63 for condensation and reuse. When the alcohol has been recovered in this manner together with part of the water if desired, the remaining solution of purified salts of the organic acids is withdrawn through pipe 65, controlled by valve 66 for storage or shipment. The solution, if desired, may be further evaporated by the use of special equipment to give the salts of the organic acids in dry form.

The layer of non-acid organic compounds and inorganic salts remaining in kettle 22 is then heated by the introduction of steam through pipe 34, to jacket 35, condensate being withdrawn through pipe 36. Additional steam may be introduced to distributor 37, controlled by valve 38, and the heating is continued in this manner until substantially all of the alcohol has been driven out of the material. During this period the alcohol vapors taken off over-head through pipe 35a discharge into pipe 62. A petroleum solvent, preferably benzene, is then introduced through pipe 39, controlled by valve 39a and thoroughly mixed with the materials present by operation of agitator 23. The mixture is then withdrawn through pipe 40, controlled by valve 41 and diverted through pipe 43 by manipulation of valves 44 and 45 into either settling tank 46 or 47. It is permitted to remain in the settling tank until substantially free of inorganic compounds which gradually settle to the bottom of the tank. These tanks are preferably equipped with thermal insulation 46a and 47a to minimize convection currents. When the inorganic compounds are substantially removed from the supernatant material, this material consisting of the non-acid organic compounds and solvent material is withdrawn through pipe 46b, controlled by valve 46c or pipe 47b, controlled by valve 47c, and transferred to still 48. This still is heated by any suitable means such as steam heater not shown, and the solvent is driven off to be condensed and recovered in condenser 49 for reuse.

Steam may be introduced through distributor 48a, controlled by valve 48b, and when the solvent has been recovered the heavy non-acid organic compounds which were associated with the organic acid may be withdrawn through pipe 48c, controlled by valve 48d for storage or shipment.

The non-acid organic compounds are capable of stabilizing emulsions of certain types and constitute a new and useful product. The sodium salts of the organic acids which I have recovered by this process are of exceptional quality for various purposes and their higher quality appears to be sustained and reproducible, in contrast to the variable character of mineral oil sulphonates heretofore produced. In particular, the new sulphonates appear to be a superior agent for reducing the surface tension of aqueous solutions, as a penetrating agent, and for stabilizing emulsions of certain types.

The foregoing specific description is intended by way of illustration and not of limitation. It is my intention that the invention be limited only by the appended claims or their equivalents in which I have endeavored to claim broadly all inherent novelty.

I claim:

1. Process of treating material containing green organic acids, and associated non-acid organic compounds, which material results from the treatment of petroleum oils with fuming sulphuric acid, the organic part of said material containing said organic acids and associated non-acid organic compounds in substantially the proportions they are found in the sludge formed on treating petroleum lubricating oil with fuming sulphuric acid, which comprises separating the organic acids from the non-acid organic compounds by subjecting the material to the action of an aqueous solution of an alcohol of not exceeding 3 carbon atoms, the alcohol being present in said solution in the proportions of from 25 to 75% by volume in which solution the organic acids are selectively soluble and the non-acid organic compounds are relatively insoluble notwithstanding the presence of the organic acids.

2. Process of treating material containing green organic acids, and associated non-acid organic compounds, which material results from the treatment of petroleum oils with fuming sulphuric acid, the organic part of said material containing said organic acids and associated non-acid organic compounds in substantially the proportions they are found in the sludge formed on treating petroleum lubricating oil with fuming sulphuric acid, which comprises separating the organic acids from the non-acid organic compounds by subjecting the material in neutral to basic solution to the action of an aqueous solution of an alcohol of not exceeding 3 carbon atoms, the alcohol being present in said solution in the proportions of from 25 to 75% by volume in which solution the organic acids are relatively soluble and the non-acid organic compounds are relatively insoluble notwithstanding the presence of the organic acids.

3. Process of treating material containing green organic acids, and associated non-acid organic compounds, which material results from the treatment of petroleum oils with fuming sulphuric acid containing at least 10% $SO_3$ by weight, the organic part of said material containing said organic acids and associated non-acid organic compounds in substantially the proportions in which they are found in the sludge formed on treating petroleum lubricating oil with fuming sulphuric acid, and associated non-acid organic compounds, which comprises separating the organic acids from the non-acid organic compounds by subjecting the material to the action of an aqueous solution of an alcohol of not exceeding 3 carbon atoms, the alcohol being present in said solution in the proportions of from 25 to 75% by volume in which solution the organic acids are relatively soluble and the non-acid organic compounds are relatively insoluble notwithstanding the presence of the organic acids.

4. Process of treating material containing green organic acids, and associated non-acid organic compounds, which material results from the treatment of petroleum oils with fuming sulphuric acid containing at least 10% $SO_3$ by weight, the organic part of said material containing said organic acids and associated non-acid organic compounds in substantially the proportions in which they are found in the sludge formed on treating petroleum lubricating oil with fuming sulphuric acid, which comprises separating the organic acids from the non-acid organic compounds by subjecting the material in neutral to basic solution to the action of an aqueous solution of an alcohol of not exceeding 3 carbon atoms, the alcohol being present in said solution in the proportions of from 25 to 75% by volume in which solution the organic acids are relatively soluble and the non-acid organic compounds are relatively insoluble notwithstanding the presence of the organic acids.

5. Process of treating sludge, containing sulphuric acid, organic acids, and non-acid organic compounds, resulting from the treatment of a petroleum lubricating oil with fuming sulphuric acid, which comprises separating sulphuric acid from said sludge, and thereafter separating the organic acids from the non-acid organic compounds by subjecting the sludge to the action of an aqueous solution of an alcohol of not exceeding 3 carbon atoms, the alcohol being present in said solution in the proportions of from 25 to 75% by volume in which solution the organic acids are relatively soluble and the non-acid organic compounds are relatively insoluble notwithstanding the presence of the organic acids.

6. Process of treating sludge, containing sulphuric acid, organic acids, and non-acid organic compounds, resulting from the treatment of a petroleum lubricating oil with fuming sulphuric acid, which comprises separating sulphuric acid from said sludge, and thereafter separating the organic acids from the non-acid organic compounds by subjecting the sludge in neutral to basic solution to the action of an aqueous solution of an alcohol of not exceeding 3 carbon atoms, the alcohol being present in said solution in the proportions of from 25 to 75% by volume in which solution the organic acids are relatively soluble and the non-acid organic compounds are relatively insoluble notwithstanding the presence of the organic acids.

7. Process of treating sludge containing sulphuric acid, organic acids, and non-acid organic compounds, resulting from the treatment of petroleum oils with fuming sulphuric acid, which comprises separating the organic acids from the non-acid organic compounds and inorganic materials by subjecting the sludge to the action of a first solvent consisting of an aqueous solution of an alcohol of not exceeding 3 carbon atoms to the molecule, the alcohol being present in said solution in the proportions of from 25 to 75% by volume in which the organic acids are relatively soluble and the non-acid organic compounds and inorganic materials are relatively insoluble notwithstanding the presence of the organic acids, dissolving the separated non-acid organic compounds in a second solvent in which the said non-acid organic compounds are selectively soluble and the inorganic materials are relatively insoluble, settling and removing the inorganic materials, thereby producing a solution containing purified non-acid organic compounds.

8. Process of treating sludge containing sulphuric acid, organic acids, and non-acid organic compounds, resulting from the treatment of petroleum oils with fuming sulphuric acid, which comprises separating the organic acids from the non-acid organic compounds by subjecting the sludge in neutral to basic solution to the action of a first solvent consisting of an aqueous solution of an alcohol of not exceeding 3 carbon atoms to the molecule, the alcohol being present in said solution in the proportions of from 25 to 75% by volume in which the organic acids are relatively soluble and the non-acid organic compounds and inorganic materials are relatively insoluble notwithstanding the presence of the organic acids, thereby separating non-acid organic compounds and inorganic materials, dissolving the separated non-acid organic compounds in a second solvent in which the said non-acid organic compounds are selectively soluble and the inorganic materials are relatively insoluble, settling and removing inorganic materials, thereby producing a solution containing purified non-acid organic compounds.

KOLACHALA SEETA RAMAYYA.